(12) United States Patent
Kim

(10) Patent No.: US 10,785,083 B2
(45) Date of Patent: Sep. 22, 2020

(54) METHOD AND APPARATUS FOR MEASURING DISPLACEMENT OF OBJECT USING MULTIPLE FREQUENCY SIGNAL

(71) Applicant: ELECTRONICS AND TELECOMMUNICATIONS RESEARCH INSTITUTE, Daejeon (KR)

(72) Inventor: Dong Kyoo Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/220,714

(22) Filed: Dec. 14, 2018

(65) Prior Publication Data

US 2019/0190767 A1 Jun. 20, 2019

(30) Foreign Application Priority Data

Dec. 15, 2017 (KR) .................. 10-2017-0173630

(51) Int. Cl.
*H04L 27/34* (2006.01)
*H04L 27/38* (2006.01)
*H04L 27/227* (2006.01)
*G01S 13/538* (2006.01)
*G01S 13/536* (2006.01)
(Continued)

(52) U.S. Cl.
CPC ........ *H04L 27/3427* (2013.01); *G01S 13/536* (2013.01); *G01S 13/538* (2013.01); *H04L 27/2273* (2013.01); *H04L 27/389* (2013.01); *H04L 27/3863* (2013.01); *H04J 1/06* (2013.01); *H04L 27/366* (2013.01)

(58) Field of Classification Search
CPC ............ H04L 27/3427; H04L 27/2273; H04L 27/3863; H04L 27/389; H04L 27/366; H04J 1/06; H04B 17/104; H04B 2001/305; G01S 13/536; G01S 13/538
See application file for complete search history.

(56) References Cited

U.S. PATENT DOCUMENTS

| 8,814,805 B2 | 8/2014 | Lin et al. |
| 9,791,561 B2 | 10/2017 | Rhee et al. |
| 2008/0119716 A1 | 5/2008 | Boric-Lubecke et al. |

(Continued)

FOREIGN PATENT DOCUMENTS

| WO | 2007-136610 A2 | 11/2007 |
| WO | 2009-009722 A2 | 1/2009 |

(Continued)

*Primary Examiner* — Sophia Vlahos
(74) *Attorney, Agent, or Firm* — LRK Patent Law Firm

(57) ABSTRACT

A method and an apparatus for measuring a displacement of an object according to steps of: dividing a signal into an I signal and a Q signal according to a phase of the signal, wherein the signal is reflected by the object after a transmission signal having a plurality of frequencies is emitted toward the object by the radar measurement system; estimating a direct current (DC) component from an N-tuple information acquired from the I signal and the Q signal; removing the estimated DC component to correct the I signal and the Q signal; and measuring the displacement of the object based on the corrected I signal and Q signal are provided.

15 Claims, 12 Drawing Sheets

(51) Int. Cl.
*H04J 1/06* (2006.01)
*H04L 27/36* (2006.01)

(56) References Cited

U.S. PATENT DOCUMENTS

| | | | |
|---|---|---|---|
| 2010/0130873 A1* | 5/2010 | Yuen | A61B 5/0205 |
| | | | 600/484 |
| 2015/0198702 A1 | 7/2015 | Kim | |
| 2015/0226848 A1 | 8/2015 | Park | |
| 2015/0241555 A1 | 8/2015 | Lin et al. | |
| 2016/0054792 A1 | 2/2016 | Poupyrev | |
| 2016/0209260 A1 | 7/2016 | Rice et al. | |
| 2016/0228010 A1 | 8/2016 | Kim et al. | |
| 2016/0320853 A1 | 11/2016 | Lien et al. | |
| 2018/0038943 A1* | 2/2018 | Ramasubramanian | |
| | | | G01S 7/4021 |
| 2018/0054262 A1* | 2/2018 | Noethlings | H03D 3/008 |

FOREIGN PATENT DOCUMENTS

| | | |
|---|---|---|
| WO | 2016-057781 A1 | 4/2016 |
| WO | 2017-097907 A1 | 6/2017 |

\* cited by examiner

METHOD AND APPARATUS FOR MEASURING DISPLACEMENT OF OBJECT USING MULTIPLE FREQUENCY SIGNAL

CROSS-REFERENCE TO RELATED APPLICATION

This application claims priority to and the benefit of Korean Patent Application No. 10-2017-0173630 filed in the Korean Intellectual Property Office on Dec. 15, 2017, the entire content of which is incorporated herein by reference.

BACKGROUND OF THE INVENTION

1. Field of the Invention

This description relates to a method and an apparatus for measuring a displacement of an object by using a multi-frequency signal.

2. Description of Related Art

Radar technology has been applied not only in defense, aerospace, ship, but also various fields such as security, location recognition, and biological signal recognition. Biological signal recognition technology can be widely applied to various fields such as safety, security, medical, biotechnology, and smart devices where human body signals can be utilized. Recently, a technique of measuring the physiological signals of the human body such as the movement of the human body, respiration, and heartbeat in a non-invasive, non-contact manner has attracted attention.

In order to measure the physiological signal of the human body, a contact type device which is directly attached to the body such as an electrocardiogram device, an optical-based pulse measurement device, a belt-type breath measurement device has been used. Recently, various non-contact physiological signal measurement methods have been studied.

For example, there is a non-contact physiological signal measurement method using a camera image. This is a method of estimating the heart rate by detecting changes in the skin color caused by the blood of the facial blood vessels from the facial image of the human body. However, there is a problem that the quality of the image is not constant depending on the ambient illumination, and the physiological signal can be measured only within the image capturing of the camera.

As another non-contact physiological signal measuring method, there is a method of measuring human motion, breathing, or heartbeat by using radar. It uses the radar to detect irregular movements of the torso, arms, and legs of the human body, and regular movement of the thorax caused by breathing and heartbeat. The non-contact physiological signal measurement method using radar satisfies the non-contact condition and can be detected from a close range or a long distance, and is not greatly affected by external brightness or weather. In addition, because the physiological signals of the human body can be detected, which is not visible to the naked eye, the field of application is wide. Therefore, bio-signal detection using radar has attracted much attention in recent years.

The field of measuring physiological signals using radar can be divided into pulse radar system and Doppler radar system. The pulse radar method is a method of estimating the movement of the human body by transmitting and receiving the pulse signal and measuring the arrival time of the pulse. In general, motion is used for motion measurements such as walking, running, and waving an arm. Recent pulsed radar technology is used to measure respiration and to analyze sleep patterns using it. In the field of safety, permeable radar technology for disaster safety is used to detect physiological signals of survivors buried in building debris during a disaster.

In the Doppler radar system, a carrier wave having a constant frequency is transmitted and received, a phase difference of arrival of a carrier wave is measured, and a physiological signal is measured. Unlike the pulse method, the Doppler radar method can measure fine movements such as human finger movements and chest movements in accordance with the frequency of the carrier wave (that is, using the small-sized frequency) as well as the large motion.

SUMMARY OF THE INVENTION

An exemplary embodiment provides a method for measuring a displacement of an object by a radar measurement system.

Another exemplary embodiment provides an apparatus for measuring a displacement of an object.

Yet another exemplary embodiment provides a radar system for measuring a displacement of an object.

According to an exemplary embodiment, a method for measuring a displacement of an object by a radar measurement system is provided. The method includes: dividing a signal into an I signal and a Q signal according to a phase of the signal, wherein the signal is reflected by the object after a transmission signal having a plurality of frequencies is emitted toward the object by the radar measurement system; estimating a direct current (DC) component from an N-tuple information acquired from the I signal and the Q signal; removing the estimated DC component to correct the I signal and the Q signal; and measuring the displacement of the object based on the corrected I signal and Q signal.

The estimating of the DC component may include: selecting at least three constellation points among N constellation points corresponding to the N-tuple information; and determining coordinates of a circumcenter of a triangle formed by the at least three selected constellation points as coordinates of the DC component.

The selecting of the at least three constellation points may include: comparing an area of the triangle with a predetermined threshold; and determining that the at least three constellation points are valid when the area of the triangle is larger than the predetermined threshold.

The selecting of the at least three constellation points may further include selecting at least three constellation points which form a triangle different from the previously selected constellation points among the N constellation points when the area of the triangle is smaller than the predetermined threshold.

The method may further include emitting the transmission signal corresponding to each frequency of the plurality of frequencies toward the object.

The transmission signal may be a signal in which a plurality of signals having different frequencies is multiplexed.

According to another exemplary embodiment, an apparatus for measuring a displacement of an object is provided. The apparatus includes: a processor and a memory, wherein the processor executes a program stored in the memory to perform: dividing a signal into an I signal and a Q signal according to a phase of the signal, wherein the signal is reflected by the object after a transmission signal having a plurality of frequencies is emitted toward the object; estimating a direct current (DC) component from an N-tuple information acquired from the I signal and the Q signal; removing the estimated DC component to correct the I signal and the Q signal; and measuring the displacement of the object based on the corrected I signal and Q signal.

When the processor performs the estimating of the DC component, the processor may execute the program to perform: selecting at least three constellation points among N constellation points corresponding to the N-tuple information; and determining coordinates of a circumcenter of a triangle formed by the at least three selected constellation points as coordinates of the DC component.

When the processor performs the selecting of the at least three constellation points, the processor may execute the program to perform: comparing an area of the triangle with a predetermined threshold; and determining that the at least three constellation points are valid when the area of the triangle is larger than the predetermined threshold.

When the processor performs the selecting of the at least three constellation points, the processor may execute the program to perform selecting at least three constellation points which form a triangle different from the previously selected constellation points among the N constellation points when the area of the triangle is smaller than the predetermined threshold.

The processor may execute the program to further perform emitting the transmission signal corresponding to each frequency of the plurality of frequencies toward the object.

The transmission signal may a signal in which a plurality of signals having different frequencies is multiplexed.

According to yet another exemplary embodiment, a radar system for measuring a displacement of an object is provided. The radar system includes: a transmitter configured to radiate a transmission signal having a plurality of frequencies toward the object; and a receiver configured to receive a signal reflected by the object and measure the displacement of the object, wherein the receiver comprises a processor configured to execute a program stored in a memory of the receiving receiver to perform: dividing a signal into an I signal and a Q signal according to a phase of the signal, wherein the signal is reflected by the object after a transmission signal having a plurality of frequencies is emitted toward the object by the radar measurement system; estimating a direct current (DC) component from an N-tuple information acquired from the I signal and the Q signal; removing the estimated DC component to correct the I signal and the Q signal; and measuring the displacement of the object based on the corrected I signal and Q signal.

When the processor performs the estimating of the DC component, the processor executes the program to perform: selecting at least three constellation points among N constellation points corresponding to the N-tuple information; and determining coordinates of a circumcenter of a triangle formed by the at least three selected constellation points as coordinates of the DC component.

When the processor performs the selecting of the at least three constellation points, the processor may execute the program to perform: comparing an area of the triangle with a predetermined threshold; and determining that the at least three constellation points are valid when the area of the triangle is larger than the predetermined threshold.

When the processor performs the selecting of the at least three constellation points, the processor may execute the program to perform selecting at least three constellation points which form a triangle different from the previously selected constellation points among the N constellation points when the area of the triangle is smaller than the predetermined threshold.

The processor may execute the program to further perform radiating the transmission signal corresponding to each frequency of the plurality of frequencies toward the object.

The transmission signal may be a signal in which a plurality of signals having different frequencies is multiplexed.

DETAILED DESCRIPTION OF THE EMBODIMENTS

Figure 1:
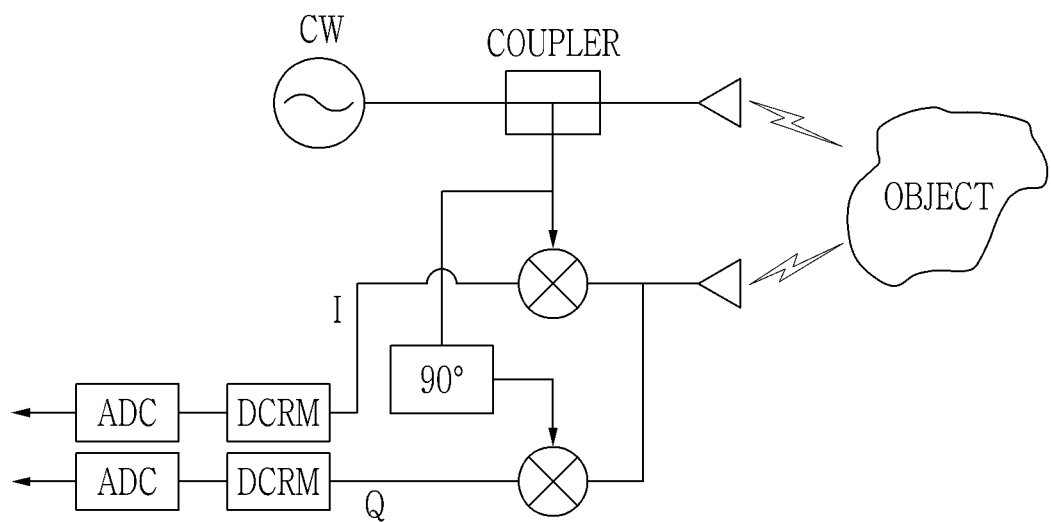
FIG. 1 is a schematic diagram illustrating a radar measurement system according to an exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

Figure 2:
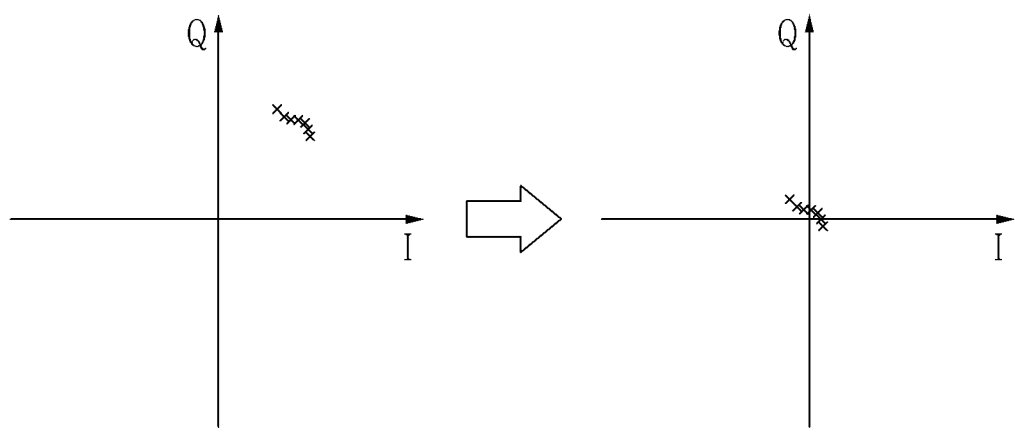
FIG. 2 is a graph illustrating I/Q coordinates of a received signal of the radar measurement system according to an exemplary embodiment.
Figure 3:
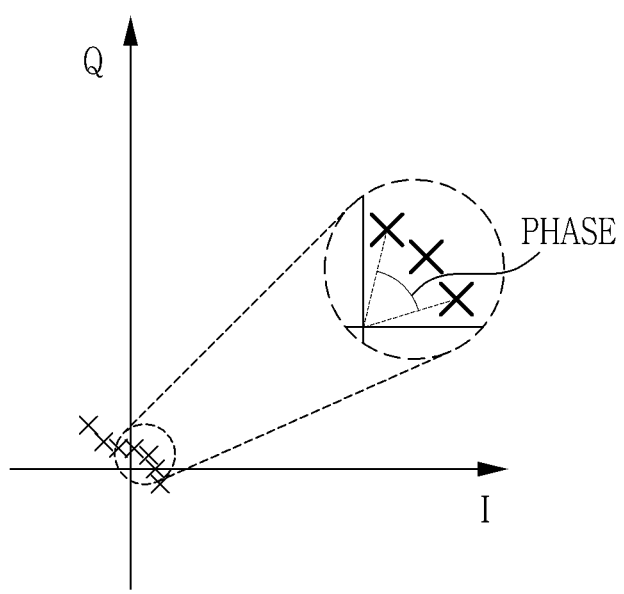
FIG. 3 is a schematic diagram illustrating a phase indicated by the I/Q coordinates of the radar measurement system according to an exemplary embodiment.

FIG. 1 is a schematic diagram illustrating a radar measurement system according to an exemplary embodiment, FIG. 2 is a graph illustrating I/Q coordinates of a received signal of the radar measurement system according to an exemplary embodiment, and FIG. 3 is a schematic diagram illustrating a phase indicated by the I/Q coordinates of the radar measurement system according to an exemplary embodiment.

Referring to FIG. 1, a sinusoidal wave signal generated from a continuous wave (CW) source is reflected from an object and is received by a receiver. The continuous wave source can vary a frequency of the sinusoidal signal. The receiver may divide the reflected signal into an in-phase signal (I signal) and a quadrature-phase signal (Q signal).

Referring to FIG. 2, the I/Q coordinates of the received signal are fixed at one position when the object does not move, and the I/Q coordinates are varied in a trajectory according to a displacement of the object. DCRM (DC remover) of FIG. 1 may prevent the saturation of an analog to digital converter (ADC) that converts an analog signal to a digital signal by removing a direct current (DC) component from the I signal and the Q signal. The left side of FIG. 2 is an I/Q plot before the DCRM is applied and the right side of FIG. 2 is an I/Q plot of the signal after the DCRM is applied. Equation 1 below represents the I signal and the Q signal before the DCRM.

$$I(t) = A_I(t)\cos\left(\frac{4\pi x_p(t)}{\lambda_{CW}} + \phi\right) + DC_I(t) \quad \text{[Equation 1]}$$

$$Q(t) = A_Q(t)\sin\left(\frac{4\pi x_p(t)}{\lambda_{CW}} + \phi\right) + DC_Q(t)$$

In Equation 1, $\phi$ is phase noise and $\lambda_{CW}$ is a wavelength of the radiated signal of single frequency radar. According to an exemplary embodiment, periodic or aperiodic motion (i.e., displacement) $x_p(n)$ of the object within one wavelength appears as a trajectory on an I/Q plot and the displacement of the object may be calculated from the phase information of the I signal and the Q signal. Equation 2 represents an arc-tangential method for measuring the displacement $x_p(n)$ of the object within the one wavelength.

$$\arctan(Q(t)/I(t)) \to x_p(n) \quad \text{[Equation 2]}$$

However, when the DCRM is applied, it is difficult to accurately estimate the displacement of the object because the phase information of the I signal and the Q signal is changed. Therefore, the DC component in the I signal and the Q signal need to be removed without the DCRM.

The DC component of the I signal and the Q signal may be generated by circuit characteristics of the radar measurement system or by the reflection characteristics of an environment surrounding the radar system. The DC component generated by the circuit characteristic is not variable, but the DC component caused by the environment of the radar system may be changed according to the change of the surroundings. For example, conventionally, the DCRM is not applied in a water level sensor or the like in a water tank. The DC component is likely to be expected because a reflection environment of the water tank in which the radar sensor is located is static. The radar for detecting the sleep level may convert the I signal and the Q signal including the DC component into a digital signal, and then estimate and remove the DC component by an algorithm. Saturation of the ADC may be avoided through a DC tuning circuit.

Even when the radar measurement system is used to detect physiological signals of a human body, the space range for the radar detection may be narrow (within a few meters) and therefore, the DCRM cannot be applied. The I signal and the Q signal converted into the digital signal without the DCRM are represented by Equation 3 below.

$$I(n) = A_I(n)\cos\left(\frac{4\pi x_p(n)}{\lambda} + \phi\right) + DC_I(n) \quad \text{[Equation 3]}$$

-continued
$$Q(n) = A_Q(n)\sin\left(\frac{4\pi x_p(n)}{\lambda} + \phi\right) + DC_Q(n)$$

The DC component in the signal of Equation 3 may be estimated as follows. First, time streams [I(1), I(2), ..., I(N)] of the I signal and [Q(1), Q(2), ..., Q(N)] of the Q signal are collected. From the collected time streams, $DC_I$, $DC_Q$, and R which satisfy Equation 4 below are computed based on the $l_1$-norm minimization algorithm. The $DC_I$ and the $DC_Q$ are center coordinates of the DC component, that is, center of a circle having the trajectory as an arc. The R is the radius of the circle having the trajectory as the arc.

$$\min\|[d_1 \ldots d_N]\|_1 (d_i = (I(i) - DC_I)^2 + (Q(i) - DC_Q)^2 - R^2) \quad \text{[Equation 4]}$$

The time streams of the I signal and the Q signal need to be collected for a sufficient time to derive $DC_I$, $DC_Q$, and R through equation 4. Therefore, if the object moves slowly, or the object moves hardly, the trajectory is not changed, so it takes a considerable amount of time to collect the time streams.

Figure 4:
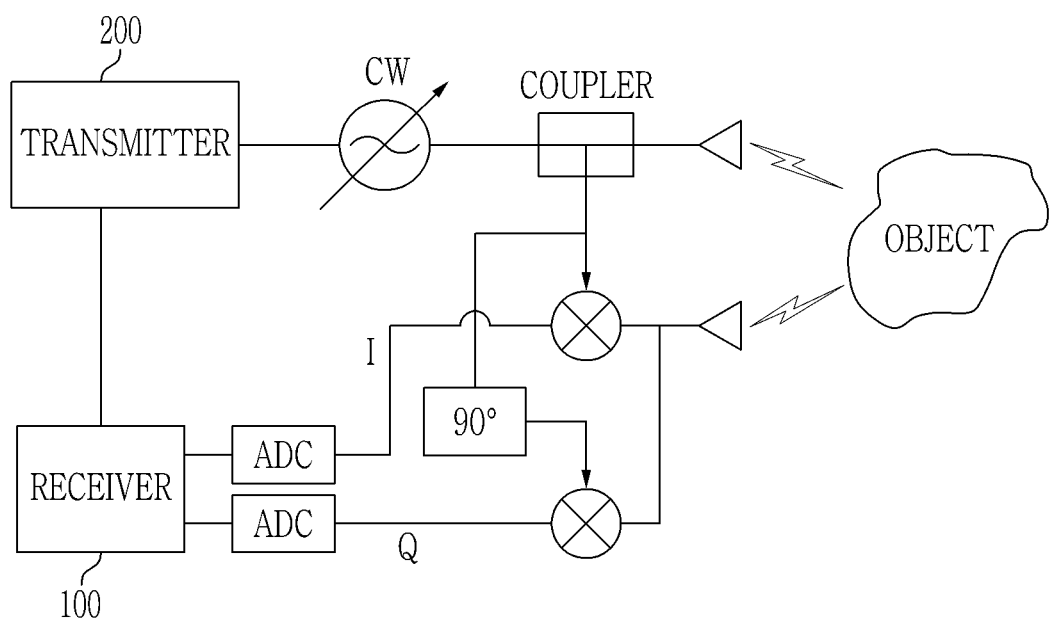
FIG. 4 is a schematic diagram illustrating a radar measurement system according to an exemplary embodiment.
Figure 5:
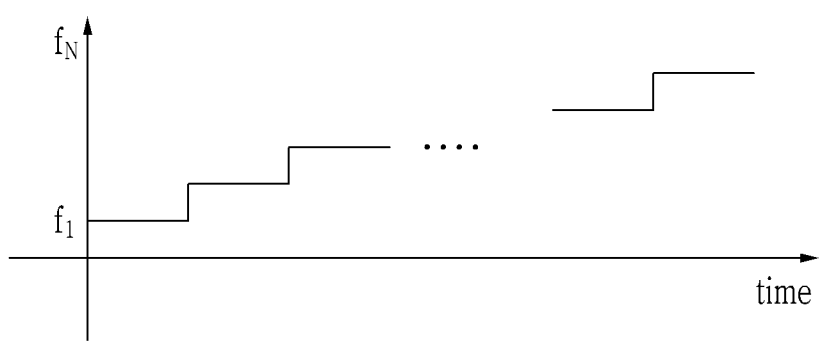
FIG. 5 is a graph illustrating transmission signals transmitted from the radar measurement system according to an exemplary embodiment.

FIG. 4 is a schematic diagram illustrating a radar measurement system according to an exemplary embodiment and FIG. 5 is a graph illustrating transmission signals transmitted from the radar measurement system according to an exemplary embodiment.

The radar measurement system according to the exemplary embodiment includes a transmitter 200 configured to radiate a transmission signal having a plurality of frequencies as shown in FIG. 5 toward an object within a sensing range and a receiver 100 configured to receive the signal reflected by the object and measure the movement of the object.

The transmitter 200 of the radar measurement system may control the continuous wave source to sequentially radiate the transmission signal by changing the frequency of the transmission signal. Referring to FIG. 5, a plurality of signals having different frequencies $f_1, \ldots, f_N$ may be radiated sequentially by the transmitter 200. Alternatively, the transmitter 200 may emit the transmission signal in which the plurality of signals having different frequencies is multiplexed. The transmitter 200 may multiplex the plurality of signals having different frequencies using an orthogonal frequency division multiplexing (OFDM) scheme and radiate the multiplexed OFDM symbol toward the object. At this time, one multiplexed signal $x(t)(=x_r+jx_Q(t))$ may be radiated through the transmission antenna of the radar measurement system.

The received signal (I signal and Q signal) corresponding to the transmission signal having the i-th frequency among the N frequencies of FIG. 5 is represented by Equation 5.

$$I_i(n) = A_{I,i}(n)\cos\left(\frac{4\pi x_p(n)}{\lambda_i} + \phi\right) + DC_{I,i}(n) \quad \text{[Equation 5]}$$

$$Q_i(n) = A_{Q,i}(n)\sin\left(\frac{4\pi x_p(n)}{\lambda_i} + \phi\right) + DC_{Q,i}(n)$$

Referring to Equation 5, the I signal and the Q signal have a wavelength $\lambda_i$ corresponding to the i-th frequency, respectively. The I signal and the Q signal of Equation 5 are the signals output from the ADC of FIG. 4. Since the radar measurement system according to the exemplary embodiment does not include the DCRM or the like, the received signal of Equation 5 includes DC components. Hereinafter, a method for measuring the movement of the object by removing the DC component from the reception signal in a digital domain as shown in Equation 5 will be described in detail with reference to FIG. 6 to FIG. 11.

Figure 6:
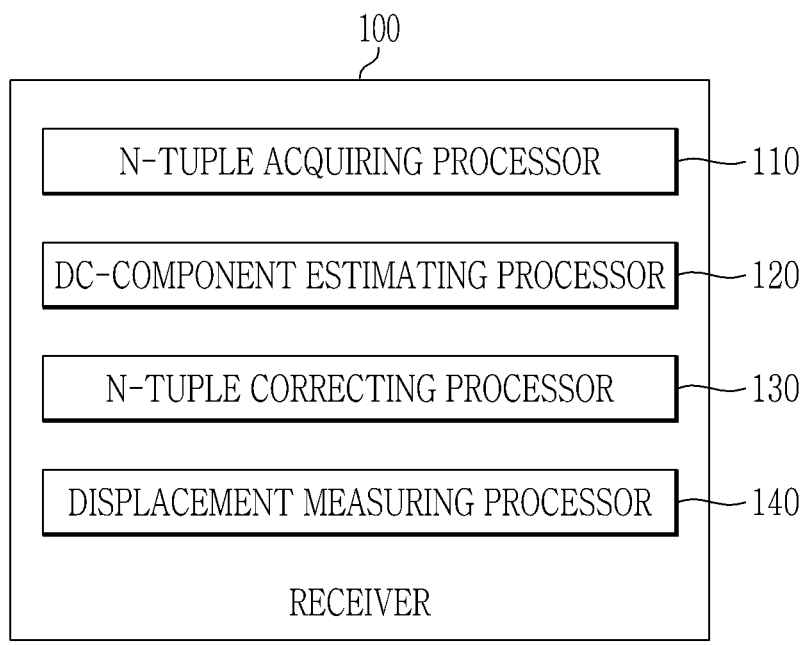
FIG. 6 is a block diagram illustrating a receiver according to an exemplary embodiment.
Figure 7:
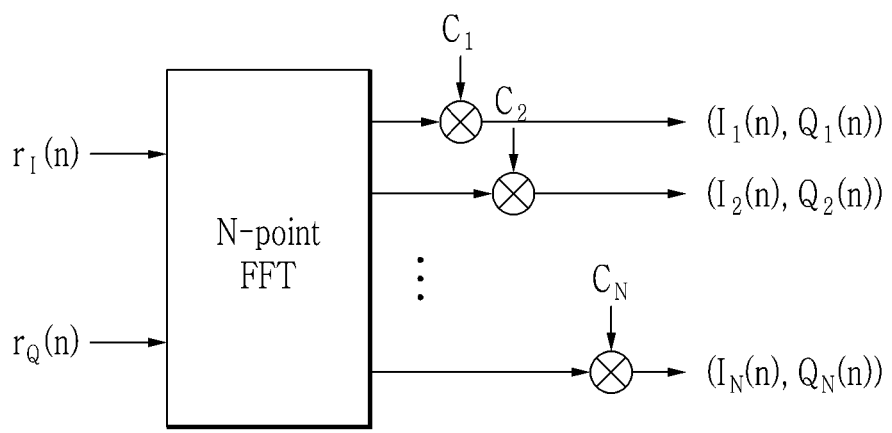
FIG. 7 is a schematic diagram for explaining a function of the N-tuple acquiring processor according to an exemplary embodiment.
Figure 8:
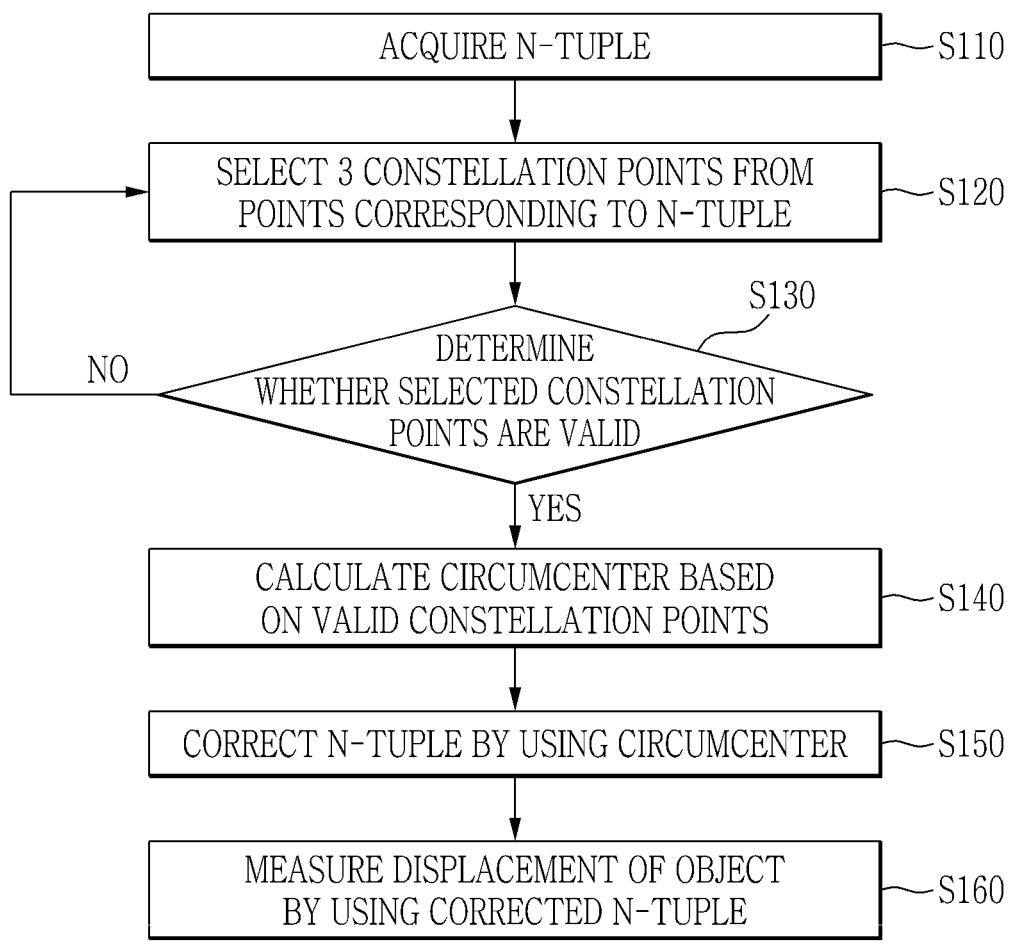
FIG. 8 is a flowchart illustrating a processing method for a received signal of the receiver according to an exemplary embodiment.
Figure 9:
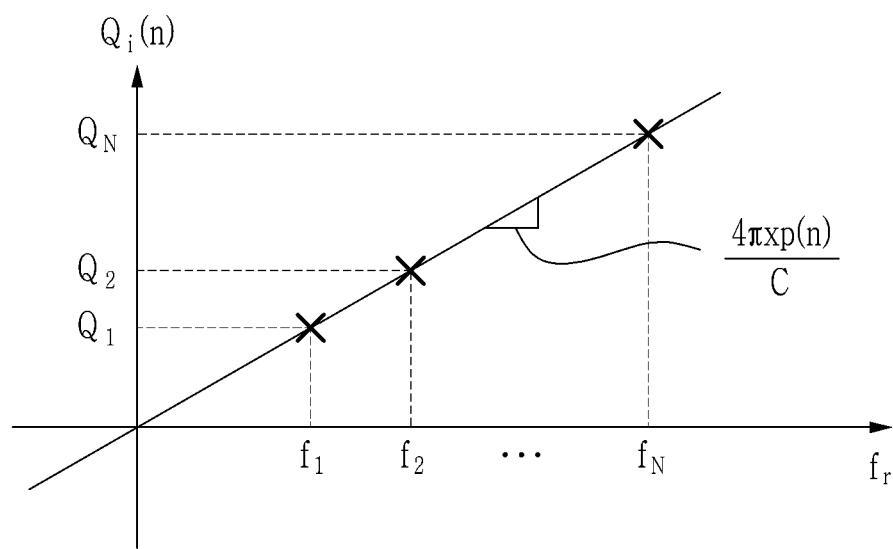
FIG. 9 is a graph illustrating a radiated signal of a radar measurement system according to an exemplary embodiment.

FIG. 6 is a block diagram illustrating a receiver according to an exemplary embodiment, FIG. 7 is a schematic diagram for explaining a function of the N-tuple acquiring processor according to an exemplary embodiment, FIG. 8 is a flowchart illustrating a processing method for a received signal of the receiver according to an exemplary embodiment, and FIG. 9 is a graph illustrating a radiated signal of a radar measurement system according to an exemplary embodiment.

Referring to FIG. 6, the receiver 100 includes an N-tuple acquiring processor 110, a DC component estimating processor 120, an N-tuple correcting processor 130, and a displacement measuring processor 140.

The N-tuple acquiring processor 110 acquires N number of I signals and N number of Q signals, that is, N-tuples, from the received signals divided according to a phase. When the distance between the radar measurement system and the object is as short as several meters or less, the N-tuple acquiring processor 110 may acquire the N-tuple within a very short period of time (e.g., for milliseconds) or less since the radar measurement system according to the exemplary embodiment may radiate the transmission signals by changing the frequency at a very short interval. Equation 6 below represents an N-tuple of the I signal and the Q signal obtained by the N-tuple acquiring processor 110.

$$[I_1(n), I_2(n), \ldots, I_N(n)], [Q_1(n), Q_2(n), \ldots, Q_N(n)] \quad \text{[Equation 6]}$$

When a symbol in which a plurality of signals having different frequencies are multiplexed is transmitted by the transmitter 200, the N-tuple acquiring processor 110 may perform N-point fast Fourier transform (FFT) for the received signal from the ADC so as to acquire the N-tuple from the multiplexed symbols. Referring to FIG. 7, when the N-point FFT is performed on a signal received from the ADC, N outputs are generated. The N-tuple acquiring processor 110 may obtain N number of I(n) and Q(n) pairs by multiplying a coefficient $C_1$ to $C_N$ for channel estimation to each output of the N-point FFT. The N-tuple acquiring processor 110 may acquire the N-tuple of the I signal and the Q signal from the N number of the I(n) and the Q(n) pairs.

The DC component estimating processor 120 estimates the DC component of the I signal and the Q signal by using the N-tuple. According to the exemplary embodiment, the DC component estimating processor 120 may select at least three constellation points among N constellation points corresponding to the N-tuple, and calculate the circumcenter of a triangle formed by the at least three constellation points as the I-coordinate ($DC_I$) and the Q-coordinate ($DC_Q$). The at least three constellation points may include the first constellation point ($I_1(n), Q_1(n)$), the last constellation point ($I_N(n), Q_N(n)$), and the middle constellation point ($I_{N/2}(n), Q_{N/2}(n)$) (($I_{N/2+1}(n), Q_{N/2+1}(n)$)) where N is odd) of the N constellation points. Three of the N constellation points may be selected in different ways, and the present invention is not limited thereto.

The N-tuple correcting processor 130 corrects the N-tuple based on the estimated DC component.

The displacement measuring processor 140 measures the displacement of the object by using the corrected N-tuple.

Referring to FIG. 8, the N-tuple acquiring processor 110 may receive the I signal and the Q signal from the ADC of the radar measurement system to obtain the N-tuple (S110). When the wavelength $\lambda_1$ corresponding to the i-th frequency is replaced with the frequency and the wavelength, the I signal and the Q signal in Equation 5 may be represented as Equation 7 below.

$$I_i(n) = A_{I,i}(n)\cos\left(\frac{4\pi x_p(n)}{c}f_i + \phi\right) + DC_{I,i}(n) \quad \text{[Equation 7]}$$

$$Q_i(n) = A_{Q,i}(n)\sin\left(\frac{4\pi x_p(n)}{c}f_i + \phi\right) + DC_{Q,i}(n)$$

When $x_p(n)$ is much shorter than the wavelength in Equation 7, a postulation of Equation 8 may be stand.

$$A_{I,1}(n) \approx A_{I,2}(n) \ldots \approx A_{I,N}(n) = A_I(n)$$

$$A_{Q,1}(n) \approx A_{Q,2}(n) \ldots \approx A_{Q,N}(n) = A_Q(n) \quad \text{[Equation 8]}$$

Then, when $f_1 \gg (f_N - f_1)$, since the difference between the DC components corresponding to each of the frequencies is not large, the following Equation 9 holds.

$$DC_{I,1}(n) \approx DC_{I,2}(n) \ldots \approx DC_{I,N}(n) = DC_I(n)$$

$$DC_{Q,1}(n) \approx DC_{Q,2}(n) \ldots \approx DC_{Q,N}(n) = DC_Q(n) \quad \text{[Equation 9]}$$

When phase noise is $\phi=0$, the Equation 7 may be expressed as Equation 10 below based on Equations 8 and 9.

$$I_i(n) = A_I(n)\cos\left(\frac{4\pi x_p(n)}{c}f_i\right) + DC_I(n) \quad \text{[Equation 10]}$$

$$Q_i(n) = A_Q(n)\sin\left(\frac{4\pi x_p(n)}{c}f_i\right) + DC_Q(n)$$

$I_i(n)$ and $Q_i(n)$ according to Equation 10 may be expressed as constellation points which are far from the center ($DC_I(n), DC_Q(n)$) by a distance $\sqrt{A_I^2(n)+A_Q^2(n)}$ at a phase $$\theta_i(n) = \frac{4\pi x_p(n)}{c}f_i.$$

The phase $$\theta_i(n) = \frac{4\pi x_p(n)}{c}f_i$$

is a linear function of which slope is $$\frac{4\pi x_p(n)}{c}$$

as shown in FIG. 9.

Figure 10:
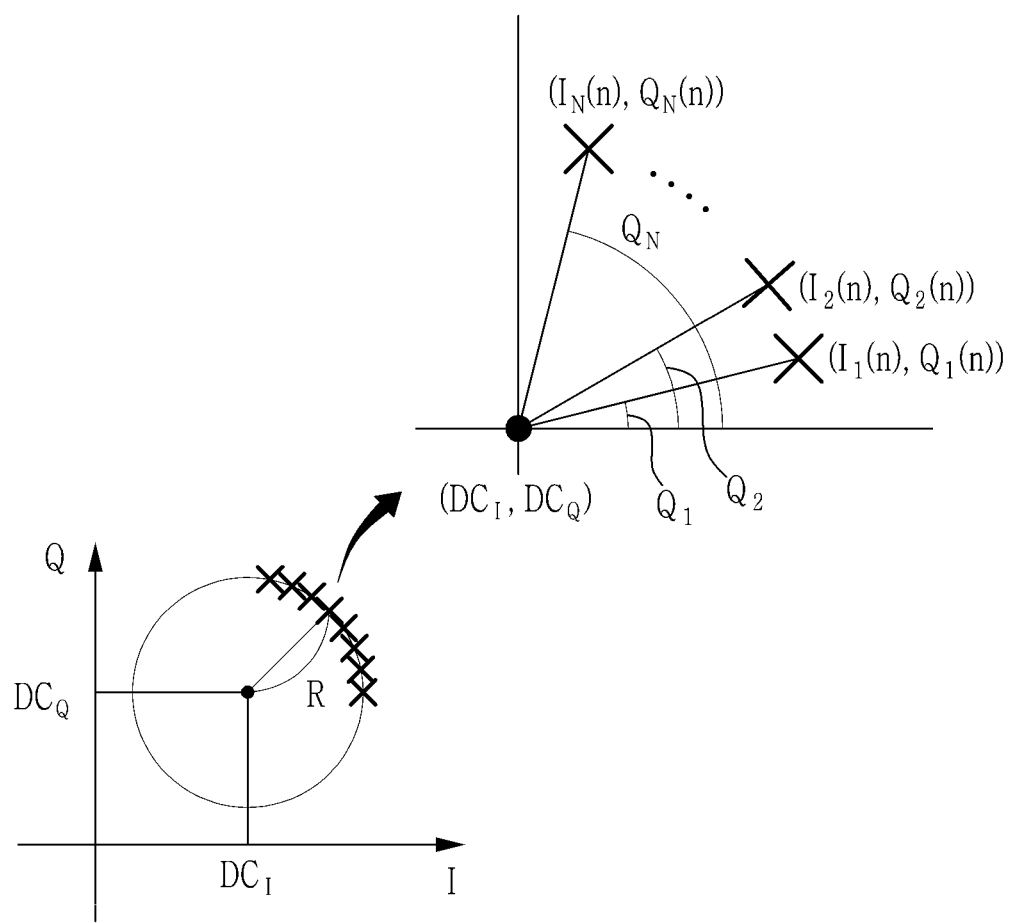
FIG. 10 is a graph showing the constellation points of an N-tuple according to an exemplary embodiment.

FIG. 10 is a graph showing the constellation points of an N-tuple according to an exemplary embodiment. In FIG. 10, the trajectory of the constellation points ($I_1(n), Q_1(n)$), ($I_2(n), Q_2(n)$), ..., ($I_N(n), Q_N(n)$) according to Equation 11 is represented by an arc having a center coordinate ($DC_I(n), DC_Q(n)$) and a radius $R=\sqrt{A_I^2(n)+A_Q^2(n)}$.

The DC component estimating processor 120 may then estimate the DC components $DC_I(n)$ and $DC_Q(n)$ at time n by using an N-tuple at time n. According to an exemplary embodiment, for estimating the DC component, the DC component estimating processor 120 selects at least three constellation points among N constellation points corresponding to the N-tuple (S120). The DC component estimating processor 120 may determine the circumcenter of the triangle formed by the at least three constellation points as the coordinates of the DC component on the I/Q plot. The DC component estimating processor 120 determines whether the selected three constellation points are valid (S130). For example, the DC component estimating processor 120 may determine that the selected constellation points are valid when the area S of the triangle formed by the three constellation points is larger than a predetermined threshold. In addition, the DC component estimating processor 120 may determine that the at least three constellation points are valid when the area S is smaller than the predetermined threshold. The predetermined threshold may be predetermined according to the frequency of the transmission signal, the surrounding environment of the radar measurement system, and the like.

Figure 11:
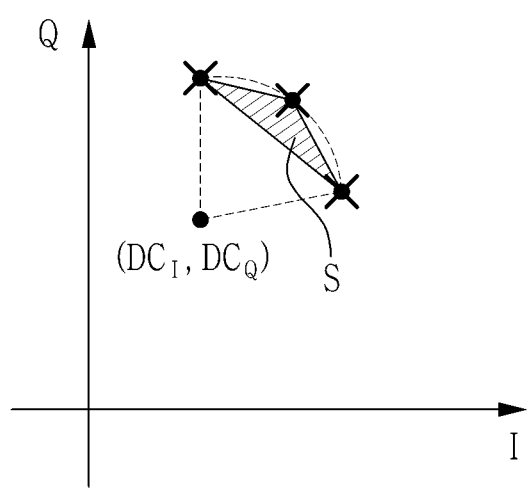
FIG. 11 is a schematic diagram showing an area S of a triangle and a triangle formed by at least three selected constellation points according to an exemplary embodiment.

FIG. 11 is a schematic diagram showing an area S of a triangle and a triangle formed by at least three selected constellation points according to an exemplary embodiment.

If it is determined that the selected constellation points (alternatively, a group of the constellation points, an ordered pair of the constellation points) are not valid, the DC component estimating processor 120 re-selects at least three constellation points from among the N constellation points. The newly selected constellation points may be different from the previously selected constellation points. For example, all the newly selected constellation points may be different from the previously selected constellation points.

Alternatively, some of the three constellation points may be different from the previously selected constellation points.

If it is determined that the selected constellation points are valid, the DC component estimating processor 120 calculates the circumcenter of the triangle formed by the selected three constellation points (S140). The DC component estimating processor 120 may determine the circumcenter corresponding to the three points as the coordinates of the DC component of the I signal and the Q signal.

The N-tuple correcting processor 130 corrects the N-tuple by using the coordinates of the estimated DC component (S150). Equation 11 below represents the corrected N-tuple.

$$I_{comp}(n)=[I_1(n),I_2(n), \ldots I_N(n)]-DC_I(n)$$

$$Q_{comp}(n)=[Q_1(n),Q_2(n), \ldots Q_N(n)]-DC_I(n) \quad \text{[Equation 11]}$$

Then, the displacement measuring processor 140 measures the displacement of the object by using the corrected N-tuple. The displacement of the object $\hat{x}_{p,i}(n)$ measured by the signal having the i-th frequency may be expressed as Equation 12 below, and the total displacement of the object $\hat{x}_p(n)$ may be expressed as Equation 13 below.

$$\hat{x}_{p,i}(n) = \frac{c}{4\pi f_i}\arctan\left(\frac{Q_i(n)}{I_i(n)}\right) \quad \text{[Equation 12]}$$

$$\hat{x}_p(n) = [\hat{x}_{p,1}(n), \hat{x}_{p,2}(n), \ldots, \hat{x}_{p,N}(n)] \quad \text{[Equation 13]}$$

The displacement measuring processor 140 according to an exemplary embodiment may determine the total displacement $\hat{x}_p(n)$ of the object based on the measured displacement $\hat{x}_{p,i}(n)$ corresponding to each frequency. For example, the displacement measuring processor 140 may determine the average value of the N partial displacements $\hat{x}_{p,i}(n)$ as the total displacement. Alternatively, the displacement measuring processor 140 may randomly select one of the N partial displacements $\hat{x}_{p,i}(n)$ to determine the selected value as the total displacement.

The displacement of the object can be accurately measured even when the object is hardly moved by using the reflection signal of the multi-frequency signal. Further, the DC component of the received signal for measuring the displacement of the object may be estimated quickly from the tuples collected in a very short time period. Consequently, the movement of objects can be efficiently measured with a small computing resource, and miniaturization of an apparatus for acquiring biometric information can be realized.

Figure 12:
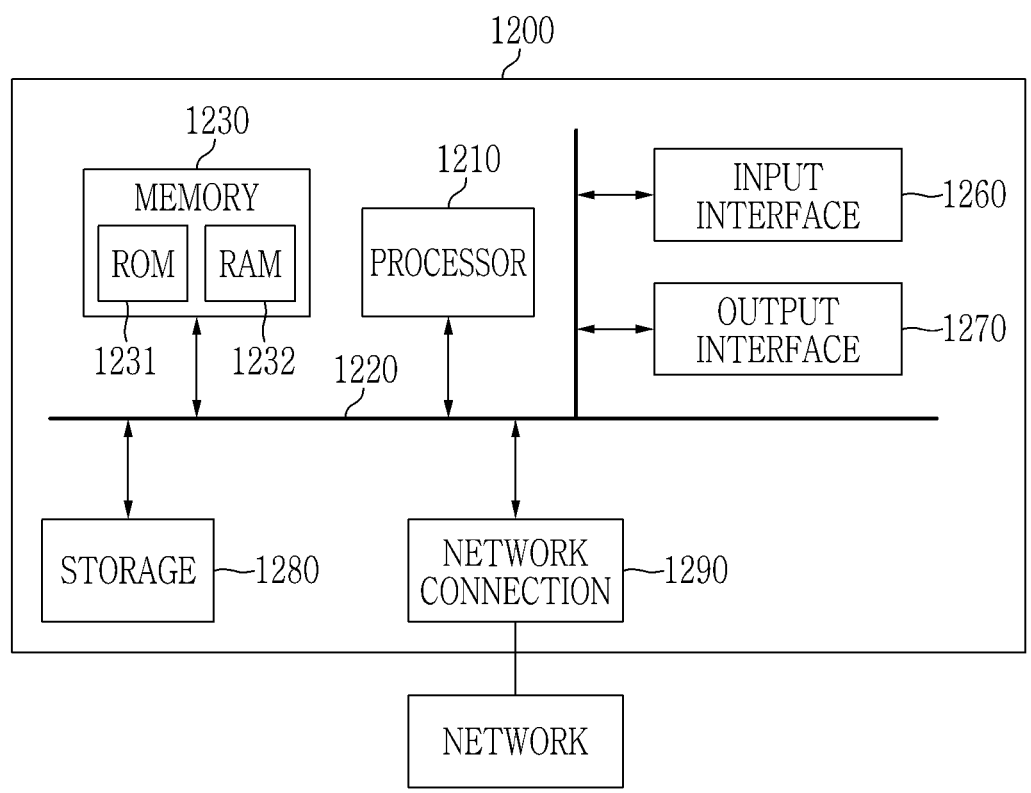
FIG. 12 is a block diagram illustrating a receiver according to an exemplary embodiment.

FIG. 12 is a block diagram illustrating a receiver according to an exemplary embodiment.

The receiver according to an exemplary embodiment may be implemented as a computer system, for example a computer readable medium. Referring to FIG. 12, a computer system 1200 may include at least one of processor 1210, a memory 1230, an input interface 1260, an output interface 1270, and storage 1280. The computer system 1200 may also include a network connection 1290 coupled to a network. The processor 1210 may be a central processing unit (CPU) or a semiconductor device that executes instructions stored in the memory 1230 or storage 1280. The memory 1230 and the storage 1280 may include various forms of volatile or non-volatile storage media. For example, the memory may include read only memory (ROM) 1231 or random access memory (RAM) 1232. In the exemplary embodiment of the present disclosure, the memory may be located inside or outside the processor, and the memory may be coupled to the processor through various means already known.

Thus, embodiments of the present invention may be embodied as a computer-implemented method or as a non-volatile computer-readable medium having computer-executable instructions stored thereon. In the exemplary embodiment, when executed by a processor, the computer-readable instructions may perform the method according to at least one aspect of the present disclosure. The network connection 1290 may transmit or receive a wired signal or a wireless signal.

On the contrary, the embodiments of the present invention are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like. Program instructions may include machine language code such as those produced by a compiler, as well as high-level language code that may be executed by a computer via an interpreter, or the like.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for measuring a displacement of an object by a radar measurement system, comprising:
    dividing a signal into an in-phase (I) signal and a quadrature-phase (Q) signal according to a phase of the signal, wherein the signal is reflected by the object after a transmission signal having a plurality of frequencies is emitted toward the object by the radar measurement system;
    estimating coordinates of a direct current (DC) component in an I/O coordinate system based on a polygon formed by N constellation points corresponding to N-tuple information acquired from the I signal and the Q signal, where N is a non-negative integer;
    removing the DC component based on the coordinates of the DC component to correct the I signal and the Q signal; and
    measuring the displacement of the object based on the corrected I signal and Q signal,
    wherein the estimating of the DC component comprises:
    selecting at least three constellation points among the N constellation points corresponding to the N-tuple information; and
    determining coordinates of a circumcenter of a triangle formed by the at least three selected constellation points as the coordinates of the DC component.

2. The method of claim 1, wherein the selecting of the at least three constellation points comprises:
    comparing an area of the triangle with a predetermined threshold; and
    determining that the at least three constellation points are valid when the area of the triangle is larger than the predetermined threshold.

3. The method of claim 2, wherein the selecting of the at least three constellation points further comprises:
    selecting at least three constellation points which form a triangle different from the previously selected constellation points among the N constellation points when the area of the triangle is smaller than the predetermined threshold.

4. The method of claim 1, further comprising
    emitting the transmission signal corresponding to each frequency of the plurality of frequencies toward the object.

5. The method of claim 1, wherein the transmission signal is a signal in which a plurality of signals having different frequencies is multiplexed.

6. An apparatus for measuring a displacement of an object, comprising:
    a processor and a memory,
    wherein the processor executes a program stored in the memory to perform:
    dividing a signal into an in-phase (I) signal and a quadrature-phase (Q) signal according to a phase of the signal, wherein the signal is reflected by the object after a transmission signal having a plurality of frequencies is emitted toward the object;
    estimating coordinates of a direct current (DC) component in an I/Q coordinate system based on a polygon formed by N constellation points corresponding to N-tuple information acquired from the I signal and the Q signal, where N is a non-negative integer;
    removing the DC component based on the coordinates of the DC component to correct the I signal and the Q signal; and
    measuring the displacement of the object based on the corrected I signal and Q signal,
    wherein when the processor performs the estimating of the DC component, the processor executes the program to perform:
    selecting at least three constellation points among the N constellation points corresponding to the N-tuple information; and
    determining coordinates of a circumcenter of a triangle formed by the at least three selected constellation points as the coordinates of the DC component.

7. The apparatus of claim 6, wherein when the processor performs the selecting of the at least three constellation points, the processor executes the program to perform:
    comparing an area of the triangle with a predetermined threshold; and
    determining that the at least three constellation points are valid when the area of the triangle is larger than the predetermined threshold.

8. The apparatus of claim 7, wherein when the processor performs the selecting of the at least three constellation points, the processor executes the program to perform
    selecting at least three constellation points which form a triangle different from the previously selected constellation points among the N constellation points when the area of the triangle is smaller than the predetermined threshold.

9. The apparatus of claim 6, wherein the processor executes the program to further perform
    emitting the transmission signal corresponding to each frequency of the plurality of frequencies toward the object.

10. The apparatus of claim 6, wherein the transmission signal is a signal in which a plurality of signals having different frequencies is multiplexed.

11. A radar system for measuring a displacement of an object, comprising:
    a transmitter configured to radiate a transmission signal having a plurality of frequencies toward the object; and
    a receiver configured to receive a signal reflected by the object and measure the displacement of the object,
    wherein the receiver comprises a processor configured to execute a program stored in a memory of the receiver to perform:
    dividing a signal into an in-phase (I) signal and a quadrature-phase (Q) signal according to a phase of the signal, wherein the signal is reflected by the object after a transmission signal having a plurality of frequencies is emitted toward the object by the radar measurement system;
    estimating coordinates of a direct current (DC) component in an I/O coordinate system based on a polygon formed by N constellation points corresponding to N-tuple information acquired from the I signal and the Q signal, where N is a non-negative integer;

removing the DC component based on the coordinates of the DC component to correct the I signal and the Q signal; and measuring the displacement of the object based on the corrected I signal and Q signal, wherein when the processor performs the estimating of the coordinates of the DC component, the processor executes the program to perform:

selecting at least three constellation points among the N constellation points corresponding to the N-tuple information; and determining coordinates of a circumcenter of a triangle formed by the at least three selected constellation points as the coordinates of the DC component.

12. The radar system of claim 11, wherein when the processor performs the selecting of the at least three constellation points, the processor executes the program to perform:

comparing an area of the triangle with a predetermined threshold; and determining that the at least three constellation points are valid when the area of the triangle is larger than the predetermined threshold.

13. The radar system of claim 12, wherein when the processor performs the selecting of the at least three constellation points, the processor executes the program to perform selecting at least three constellation points which form a triangle different from the previously selected constellation points among the N constellation points when the area of the triangle is smaller than the predetermined threshold.

14. The radar system of claim 11, wherein the processor executes the program to further perform radiating the transmission signal corresponding to each frequency of the plurality of frequencies toward the object.

15. The radar system of claim 11, wherein the transmission signal is a signal in which a plurality of signals having different frequencies is multiplexed.

* * * * *